United States Patent
Munshi et al.

(10) Patent No.: US 8,555,852 B2
(45) Date of Patent: Oct. 15, 2013

(54) GASEOUS-FUELLED STOICHIOMETRIC COMPRESSION IGNITION INTERNAL COMBUSTION ENGINE

(71) Applicant: Westport Power Inc., Vancouver (CA)

(72) Inventors: Sandeep Munshi, Delta (CA); Alan B. Welch, Vancouver (CA); Gordon P. McTaggart-Cowan, Vancouver (CA)

(73) Assignee: Westport Power Inc., Vancouver, British Columbia (CA)

( * ) Notice: Subject to any disclaimer, the term of this patent is extended or adjusted under 35 U.S.C. 154(b) by 0 days.

(21) Appl. No.: 13/769,186

(22) Filed: Feb. 15, 2013

(65) Prior Publication Data
US 2013/0179050 A1    Jul. 11, 2013

Related U.S. Application Data

(63) Continuation of application No. PCT/CA2011/050495, filed on Aug. 12, 2011.

(51) Int. Cl.
| | |
|---|---|
| F02M 21/02 | (2006.01) |
| F02M 25/07 | (2006.01) |
| F02D 19/10 | (2006.01) |
| F02B 43/04 | (2006.01) |

(52) U.S. Cl.
USPC ............... 123/299; 123/525; 123/27 GE

(58) Field of Classification Search
USPC ............ 123/299, 300, 305, 525, 526, 568.11, 123/568.12, 27 R, 27 GE
See application file for complete search history.

(56) References Cited

U.S. PATENT DOCUMENTS

| | | | |
|---|---|---|---|
| 5,343,702 A * | 9/1994 | Miyajima et al. | 123/431 |
| 5,365,902 A | 11/1994 | Hsu | |
| 5,875,743 A | 3/1999 | Dickey | |
| 6,073,862 A | 6/2000 | Touchette et al. | |
| 6,378,489 B1 * | 4/2002 | Stanglmaier et al. | 123/304 |
| 6,439,192 B1 | 8/2002 | Ouellette et al. | |
| 6,550,430 B2 * | 4/2003 | Gray | 123/27 GE |
| 6,598,584 B2 * | 7/2003 | Beck et al. | 123/299 |
| 6,659,071 B2 * | 12/2003 | LaPointe et al. | 123/299 |
| 6,679,224 B2 | 1/2004 | Stanglmaier | |

(Continued)

OTHER PUBLICATIONS

A.E. Catania, "A refined two-zone heat release model for combustion analysis in SI engines", JSME Int'l Journal, 2003, pp. 75-85, vol. 46, No. 1.

(Continued)

Primary Examiner — Stephen K Cronin
Assistant Examiner — Arnold Castro
(74) Attorney, Agent, or Firm — Corridor Law Group, P.C.

(57) ABSTRACT

In a gaseous-fuelled stoichiometric compression ignition internal combustion engine, a pilot fuel is injected directly into the combustion chamber to help initiate a multi-point ignition. The engine provides performance improvements approaching those of high pressure direct injection engines but with less complexity because the gaseous fuel is introduced into the intake air subsystem at relatively low pressure and as a result of the stoichiometric combustion, the low oxygen content in the combustion products exiting the combustion chamber allows the use of a three-way catalyst instead of other after treatment arrangements normally associated with conventional compression ignition engines that require the addition of a reductant.

35 Claims, 7 Drawing Sheets

(56) References Cited

U.S. PATENT DOCUMENTS

| | | |
|---|---|---|
| 6,761,325 B2 | 7/2004 | Baker et al. |
| 6,845,746 B2 | 1/2005 | Hilger et al. |
| 6,912,992 B2 * | 7/2005 | Ancimer et al. ............. 123/299 |
| 6,962,143 B2 | 11/2005 | Ryan, III et al. |
| 7,028,644 B2 | 4/2006 | Cohn et al. |
| 7,077,115 B2 | 7/2006 | Weber et al. |
| 7,093,432 B2 | 8/2006 | Hanaoka et al. |
| 7,133,761 B2 | 11/2006 | Ancimer |
| 7,188,607 B2 | 3/2007 | Kobayashi |
| 7,200,487 B2 | 4/2007 | Ancimer |
| 7,281,514 B2 | 10/2007 | Hill et al. |
| 7,290,522 B2 | 11/2007 | Heywood et al. |
| 7,389,752 B2 | 6/2008 | Alger, II et al. |
| 7,444,231 B2 | 10/2008 | Ancimer et al. |
| 7,461,628 B2 | 12/2008 | Blumberg et al. |
| 2002/0157619 A1 * | 10/2002 | Gray ............................. 123/431 |
| 2003/0084876 A1 * | 5/2003 | Stanglmaier .................. 123/431 |
| 2007/0023002 A1 * | 2/2007 | Alger et al. ................... 123/275 |

OTHER PUBLICATIONS

International Search Report and Written Opinion of the International Searching Authority issued on Oct. 12, 2011, in connection with International Application No. PCT/CA2011/050495.

International Preliminary Report on Patentability issued on Feb. 19, 2013, in connection with International Application No. PCT/CA2011/050495.

* cited by examiner

GASEOUS-FUELLED STOICHIOMETRIC COMPRESSION IGNITION INTERNAL COMBUSTION ENGINE

CROSS-REFERENCE TO RELATED APPLICATION(S)

This application is a continuation of International Application No. PCT/CA2011/050495, having an international filing date of Aug. 12, 2011, entitled "Gaseous-Fuelled Stoichiometric Compression Ignition Internal Combustion Engine". The '495 international application claimed priority benefits, in turn, from U.S. Provisional Patent Application Ser. No. 61/374,257 filed Aug. 16, 2010, also entitled "Gaseous-Fuelled Stoichiometric Compression Ignition Internal Combustion Engine". The '495 international application is hereby incorporated by reference herein in its entirety.

FIELD OF THE INVENTION

The present invention relates to a gaseous-fuelled stoichiometric compression ignition internal combustion engine and, in particular, to engines operating with pilot ignition.

BACKGROUND OF THE INVENTION

Internal combustion engines have been used to produce power and drive machines for over a century. From the beginning, internal combustion engines have undergone many improvements to become more efficient, more powerful, and/or less polluting. Various modifications to engine design along with many alternative fuel choices have been considered. In this disclosure, gaseous fuels are fuels that are in the gaseous phase at atmospheric pressure and temperature, and are gases that are combustible in an internal combustion engine of the disclosed type, with examples of such gaseous fuels being methane, ethane, propane, and other lighter flammable hydrocarbon derivatives as well as hydrogen and natural gas and other mixtures thereof. In particular, natural gas, being cleaner burning relative to conventional diesel fuels, and being abundant and more widely distributed around the world, has been receiving renewed attention as a substitute for more traditional fuels such as gasoline and diesel. That is, factors such as price, availability, energy security, and environmental concerns are leading more fuel users to consider alternative fuel options.

Natural gas has been used as a fuel in vehicular internal combustion engines for over fifty years. Historically, natural gas driven vehicles were naturally fumigated, meaning that natural gas was introduced into the intake manifold, with a mixture of fuel and intake air fed into the cylinders through the open intake valve. With such engines, the most common approach for igniting a gaseous-fuel/air mixture is to employ spark ignition because unlike liquid fuels like diesel, gaseous fuels are generally more difficult to ignite by compression ignition.

Generally there are two types of spark ignited gaseous-fuelled engines that have been commercialized, namely so-called lean burn engines that deliver an excess amount of oxygen to the combustion chamber, and engines that operate in a stoichiometric mode in which the gaseous-fuel/air mixture is controlled so that during combustion essentially all of the fuel is combined with essentially all of the free oxygen. That is, with an ideal stoichiometric fuel/air mixture there is just enough oxygen to burn essentially all of the available fuel. Lean burn engines and stoichiometric engines each have their advantages and disadvantages. For example, lean burn engines generally allow higher compression ratios and combined with lower throttling losses, this can provide higher efficiency and lower fuel consumption. A disadvantage of lean burn engines is that the presence of excess oxygen in the exhaust gas exiting the combustion chamber makes a lean burn engine incompatible with modern three way catalyst aftertreatment subsystems, which means that a more expensive aftertreatment subsystem is required to reduce $NO_x$ levels.

Stoichiometric engines normally have lower compression ratios compared to lean burn engines, which normally results in lower efficiency and/or lower power output, but the combustion products are compatible with modern three-way catalyst aftertreatment subsystems so this has helped stoichiometric engines to meet recent emissions standards without requiring the more complex and more expensive aftertreatment subsystems needed by lean burn engines. For example, the applicant's related company, Cummins Westport Inc. recently offered an advanced natural gas engine that operates in a stoichiometric mode, with exhaust gas recirculation and spark ignition, and engines with this combination of features are referred to herein as SESI engines. Compared to earlier engines, it uses relatively high rates of cooled exhaust gas recirculation (EGR) to reduce excess air and thereby reduce the production of $NO_x$ during combustion, while also lessening the likelihood of combustion knock.

Another approach for natural gas engines is not stoichiometric and involves the use of compression ignition to ignite the fuel/air mixture (the diesel principle) instead of spark ignition. Higher compression ratios are used than those used in spark ignited engines, thus allowing for greater power and efficiency. However, as noted previously, a charge consisting of gaseous fuel and air is difficult to ignite by compression alone without the use of an ignition assisting device, such as the ignition of a more readily ignited pilot fuel, such as a small amount of diesel fuel, or a glow plug or other hot surface.

When a pilot fuel is used it is typically directly injected into the combustion chamber of the engine cylinders to initiate ignition of the primary gaseous fuel. The pilot fuel mixes with air in the combustion chamber, ignites as a result of the pressure/temperature conditions therein, and in turn ignites the gaseous fuel. The amount of pilot fuel required can be very small, for instance approximately 1% of the total fuel present. Such pilot operation is sometimes referred to as "micropilot" and this term is defined herein to mean this.

Engines using a compression ignition approach and operating primarily with fumigated gaseous fuel are often referred to as "dual fuel" engines and are referred to herein as such. Dual fuel engines can inject diesel pilot fuel directly into the combustion chamber for ignition purposes and EGR can be employed. However, this approach uses an excess amount of air since it does not employ a throttle and therefore it is not stoichiometric, and like lean burn engines, dual fuel engines require more complicated and expensive exhaust treatment to treat emissions. An advantage of dual fuel engines is that they allow for a relatively easy retrofit of existing diesel engines. In addition, it allows for the use of diesel only (100% pilot fuel) should that prove desirable or necessary.

In general, engines can be made more efficient, more powerful, and less polluting with more precise control over the timing for fuel injection, the quantity of fuel injected, and the rate of fuel injection during an injection event. Better efficiency and emissions can be achieved in a gaseous-fuelled engine if the gaseous fuel is injected directly into the cylinders under high pressure with the timing for start of injection beginning near the end of the compression stroke of the piston. This approach reduces the potential for combustion knock and allows gaseous-fuelled engines to be operated with the same compression ratios as conventional diesel engines. However, this requires a more complicated and expensive fuel supply subsystem which can deliver both the primary gaseous fuel and the pilot fuel at injection pressures of at least 200 bar.

Advanced engines using direct injection of gaseous fuels into the combustion chambers of the engine cylinders at such injection pressures are disclosed, for example, in co-owned U.S. Pat. Nos. 6,073,862, 6,439,192 and 6,761,325. Therein and herein, these engines are referred to as high pressure direct injection engines or "HPDI engines". While offering advantages compared to other gaseous-fuelled engines in terms of power, efficiency and high potential substitution percentages of primary gaseous fuel for diesel, such engines operate in a lean mode, with excess air (not stoichiometric), like conventional diesel engines. Accordingly, to comply with current emissions requirements in many jurisdictions, compared to stoichiometric engines, HPDI engines typically require a more complicated and expensive aftertreatment subsystem for treatment of the exhaust.

A variation of HPDI uses a glow plug or other hot surface ignition device instead of a pilot fuel, to ignite the gaseous fuel. Engines that use this approach are disclosed, for example, in co-owned U.S. Pat. Nos. 6,845,746, 7,077,115 and 7,281,514. In the disclosed preferred embodiments, a gaseous fuel is injected directly into the combustion chamber, with the timing for start of injection being late in the compression cycle near or at top dead center and at about the same injection pressure as HPDI engines that employ a pilot fuel.

Numerous other engine embodiments have been contemplated and disclosed in the art where the primary fuel is other than natural gas. For instance, the Southwest Research Institute (SWRI), in U.S. Pat. No. 6,679,224, discloses a diesel engine employing EGR that is adapted to work temporarily under stoichiometric conditions, and in particular to provide a means for regenerating a lean $NO_x$ trap without introducing unburned fuel into the exhaust stream of the engine, or requiring additional substances for operating the engine or aftertreatment device. The primary fuel is diesel, and it teaches using a second fuel such as distilled diesel, gasoline, natural gas, liquid petroleum gas (LPG), or hydrogen, which is temporarily injected into the intake manifold to premix with air before it is introduced into the combustion chamber. In U.S. Pat. No. 7,389,752, SWRI also teach an engine embodiment where gasoline is the preferred primary fuel and lubricating oil is the micro pilot ignition fuel. A high level of EGR (for instance 25-60%) can be used. Neither of these disclosures by SWRI teaches using a gaseous fuel as the primary fuel, and adjusting the method of operating the engine in a different way from a conventional liquid-fuelled engine to take advantage of the different properties of gaseous fuels such as, for example, the combustion of such gaseous fuels producing less particulate matter, also known as soot, which can allow higher levels of EGR without the effect of recirculating large amounts of soot, and the generally higher flammability limits and longer ignition delays that can help to reduce the danger of combustion knocking.

Even though internal combustion engines have undergone continuous improvement for more than a century, the combustion process in an internal combustion engine is complex and even now it is not fully understood. There are many variables and combinations of features that have not been tried and without investigation by computer modeling and/or experimental testing, the effect of a previously untried combination can not be accurately predicted. As discussed above, with respect to gaseous-fuelled engines, there have been approaches that have used spark ignition, pilot ignition, hot surface ignition, and there have been lean burn engines, stoichiometric engines, and there have been port injected fumigated engines with pre-mixed fuel-air mixtures and directly injected stratified fuel-air mixtures, and there have been engines that use three way catalysts and engines that use relatively more complex aftertreatment subsystems such as selective catalytic reduction, which requires the addition of a reductant such as urea.

A concern with engine technology in general is the need to prevent unacceptable combustion knock which can become more problematic as in-cylinder temperatures get higher and/or with higher compression ratios and/or lower octane fuels, and so on. Various techniques have been suggested in the art to control or reduce combustion knock. For instance, U.S. Pat. No. 7,028,644 discloses adding hydrogen to avoid combustion knocking and to allow for higher levels of cooled EGR in spark ignited, gasoline engines with high compression ratios. U.S. Pat. Nos. 7,290,522 and 7,461,628 disclose two mode engines with addition of hydrogen or varied amounts of injected ethanol to respectively prevent combustion knock.

Much work has been done to improve engine performance and provide for alternative fuel use. Among known gaseous-fuelled engine technologies, HPDI has been shown to yield the highest performance and efficiencies, which makes HPDI the preferred choice for certain applications. However, for less demanding applications, which do not require such high performance, there is a need for an engine that is simpler and less expensive. The present technique addresses this and other needs.

SUMMARY OF THE INVENTION

The present technique relates to gaseous-fuelled stoichiometric compression ignition, internal combustion engines that are operated with pilot ignition. According to the present method, the primary fuel is a gaseous fuel with the pilot fuel being a fuel that is more readily auto-ignited under the normal conditions found in a compression ignition engine. The total amount of fuel is the amount of gaseous fuel combined with the amount of pilot fuel. On average, on an energy basis, the gaseous fuel, being the primary fuel, represents the majority of the fuel consumed by the engine, and depending upon the operating conditions the primary fuel can be at least up to 90% of the total fuel delivered to the combustion chamber. The method generally comprises determining by mass the amount of primary fuel introduced into the combustion chamber based on a desired engine load, taking into account the energy provided by the pilot fuel so as to not result in over-fuelling. Also based upon the desired engine load and/or other engine operating conditions, the method further comprises determining by mass an amount of exhaust gas that is cooled and recirculated back to the combustion chamber through an exhaust gas recirculation subsystem. Then, with the total amount of fuel known, and the amount of exhaust gas to be recirculated also known, an amount of air from an intake manifold is delivered into the combustion chamber, wherein the amount of air is controlled using an air/fuel ratio control means and the predetermined amount of air is matched to the total amount of fuel to produce essentially stoichiometric conditions within the combustion chamber during normal operating conditions. The pilot fuel is injected directly into the combustion chamber through a pilot fuel injector, with the timing for injecting the pilot fuel being late in the compression cycle, taking into account the ignition delay for the pilot fuel, and timing the start of combustion to occur at or near top dead center.

The present method uses the determination of the amount of fuel and exhaust gas by mass, and a person skilled in the art will easily understand that equivalent methods of determining the above amount by mass can be based on measurements of volume and pressure or other parameters that correlate to mass.

While the pilot fuel injector is located where its nozzle can inject pilot fuel directly into the combustion chamber, the primary fuel injector can be one injector with a nozzle for introducing the gaseous primary fuel into the intake manifold or alternatively directly into the combustion chamber at low pressure, or the apparatus can comprise a plurality of primary fuel injectors, each one associated with a respective intake port or combustion chamber. When the gaseous fuel is injected directly into the combustion chamber, the timing of the gaseous fuel injection is preferably controlled to take place during the beginning of the compression stroke, for example the gaseous fuel injection is controlled to start between 80 and 180 crank angle degrees before top dead center. Also, the gaseous fuel injection can be controlled to start during the intake stroke.

In the present method, the air/fuel ratio control means can comprise a throttle, different variable valve actuation strategies, pulse width modulation of the natural gas injected into the intake manifold, controlling the EG valve in the exhaust gas recirculation system, or a combination thereof. By "pulse width" a person skilled in the art understands the duration of a gaseous fuel injection event.

A person skilled in the art would understand that some variable valve actuation ("VVA") strategies comprise varying only the timing of the intake valve opening and/or closing while other actuation strategies can comprise only varying the intake valve lift and still other strategies can allow varying both the timing and the lift of the intake valve.

In preferred embodiments, because the primary fuel is pre-mixed with the intake air, and the engine's compression ratio is kept high enough for reliable compression ignition of the pilot fuel, the present engine and methods for operating it preferably employ strategies designed to prevent combustion knock. To control combustion knock, the method can comprise one or more steps selected from the group consisting of: choosing an engine compression ratio that is lower than that of conventional diesel engines, but higher than that of conventional SESI engines, dynamically controlling the compression ratio by varying timing for opening and closing the intake valve for each cylinder, increasing the cooling of the intake air such that the intake charge mixture is below 60° C. when it enters the combustion chamber; increasing the amount of recirculated cooled exhaust gas; increasing the cooling of the recirculated exhaust gas; and managing ring blow-by and positive crank case ventilation so as to be less than about 2% of the total flow to the engine. The engine preferably operates at a compression ratio smaller than 14:1.

The present engine and methods for operating it can also employ strategies to control the pumping losses when the engine is operating below a predetermined low load by controlling the timing of the intake valve opening and closing and/or the intake valve lift, deactivating at least one of the engine's combustion chambers such that air and gaseous and pilot fuels are introduced in a reduced number of engine combustion chambers, or opening a bypass valve in the engine's exhaust gas system such that at least some of the exhaust gas bypasses a turbocharger installed on an exhaust line connected to said engine.

One preferred VVA strategy which involves early intake valve closing ("EIVC"), comprises opening the intake valve when the piston associated with the engine combustion chamber is at or near top dead center ("TDC") of the intake stroke and closing the intake valve when before the piston reaches bottom dead center ("BDC") of the intake stroke and preferably before the piston reaches 20 crank angle degrees before the bottom dead center of the intake stroke.

Another preferred VVA strategy which involves late intake valve closing ("LIVC") comprises opening the intake valve when the piston associated with the engine combustion chamber is at or near top dead center of the intake stroke and closing the intake valve during the piston's compression stroke when the piston is at a crank angle greater than 20 degrees after bottom dead center of the piston's intake stroke. Preferably, the intake valve is closed before the piston reaches 120 crank angle degrees after the bottom dead center of the intake stroke.

The present engine generally comprises a combustion chamber; a gaseous primary fuel injector for introducing gaseous primary fuel into an intake air manifold, or an intake port or directly into the combustion chamber; a pilot fuel injector for injecting pilot fuel into the combustion chamber; an exhaust gas recirculation subsystem; means for controlling the air/fuel ratio of the combustion mixture; and an engine controller programmed to control the gaseous primary fuel injector, the pilot fuel injector, the exhaust gas recirculation subsystem, and the air/fuel ratio control means such that the air/fuel ratio is essentially stoichiometric during normal operation of the engine.

The gaseous primary fuel injector is preferably located in the intake air manifold or an intake port, and for engines having a plurality of cylinders, it can be desirable to employ a plurality of primary fuel injectors, with one associated with each intake port. This approach is known as port injection. In another embodiment, the gaseous primary fuel can be introduced directly into each cylinder with the introduction of fuel timed to be during the intake stroke or early in the compression stroke so that it is still injected at relatively low pressure, compared to more conventional direct injection approaches that introduce the fuel later in the compression stroke when the piston is closer to top dead center.

The means for controlling the introduction of air and/or recirculated exhaust gas into the combustion chamber comprise throttling means, an intake valve, an exhaust valve and an EGR valve. The engine comprises a controller programmed to control the means for controlling the introduction of air and/or recirculated exhaust gas into said combustion chamber to achieve a stoichiometric oxygen/fuel ratio during the engine's normal operation. The controller is programmed to control the intake valve opening and closing and/or the intake valve lift to achieve a stoichiometric oxygen/fuel ratio.

In one preferred embodiment, the engine controller is programmed to control the intake valve such that it opens when a piston associated with the combustion chamber is at or near top dead center of the piston's intake stroke and it closes during the piston's intake stroke. Preferably the controller controls the intake valve such that it closes before 20 crank angle degrees before bottom dead center of the piston's intake stroke.

In another preferred embodiment, the engine controller is programmed to control the intake valve such that it opens when a piston associated with the combustion chamber is at or near top dead center of the piston's intake stroke and it closes during the piston's compression stroke, at a crank angle greater than 20 degrees after bottom dead center of the piston's intake stroke. Preferably the controller is programmed to control the intake valve such that it closes before 120 crank angle degrees after bottom dead center of the piston's intake stroke.

In one embodiment of the present engine an exhaust gas line connected to the engine comprises a turbocharger and a bypass valve for bypassing the turbocharger and the engine controller controls the bypass valve to completely or partially open it when the engine operates at low loads. This has the effect of lowering the pumping work required for the engine's efficient operation.

The engine controller is also programmed to deactivate at least one of the engine's cylinders such that air and gaseous and pilot fuel s are introduced into a reduced number of cylinders for generating power through combustion when the engine is operating at low loads. This also reduces the overall pumping work required for the engine's efficient operation.

An advantage of the present arrangement is that the internal combustion engine can comprise an inexpensive three way catalyst exhaust treatment subsystem. The means for controlling the air/fuel ratio of the combustion mixture can comprise a throttle, different variable valve actuation strategies or pulse width modulation (PWM) of the gaseous fuel injector.

The present stoichiometric, compression ignition, internal combustion engine and this operation strategy has been found to be particularly suited for operation with natural gas as the gaseous primary fuel and diesel as the pilot fuel.

DETAILED DESCRIPTION OF PREFERRED EMBODIMENT(S)

For purposes of focus and brevity certain aspects of the embodiments that are conventional and well known to those familiar with gaseous fuelled engine technology are not described in detail.

In the prior art, certain terms have been used in different contexts and in different publications to have different meanings. Accordingly, in the context of this disclosure and the description of the present method and apparatus, the following terms are defined as follows:

"Stoichiometric" refers to situations pertaining to oxidant and fuel mixtures in which the total amount of oxidant is balanced with the total amount of fuel present such that both would be essentially completely consumed when combusted. Numerically the total oxidant/total fuel ratio is preferably 1±0.1 and more preferably 1±0.05.

"Normal" engine operation refers to the various routine modes of operation for the engine when operating in a steady state (for example: idle, light load, full load). Most of the time, the engine is expected to operate in one of these modes. However, this does not include special situations, such as relating to maintenance, diagnostics, transient conditions or the like.

"Low pressure" with respect to fuel injection refers to pressures below about 50 bar.

Figure 1:
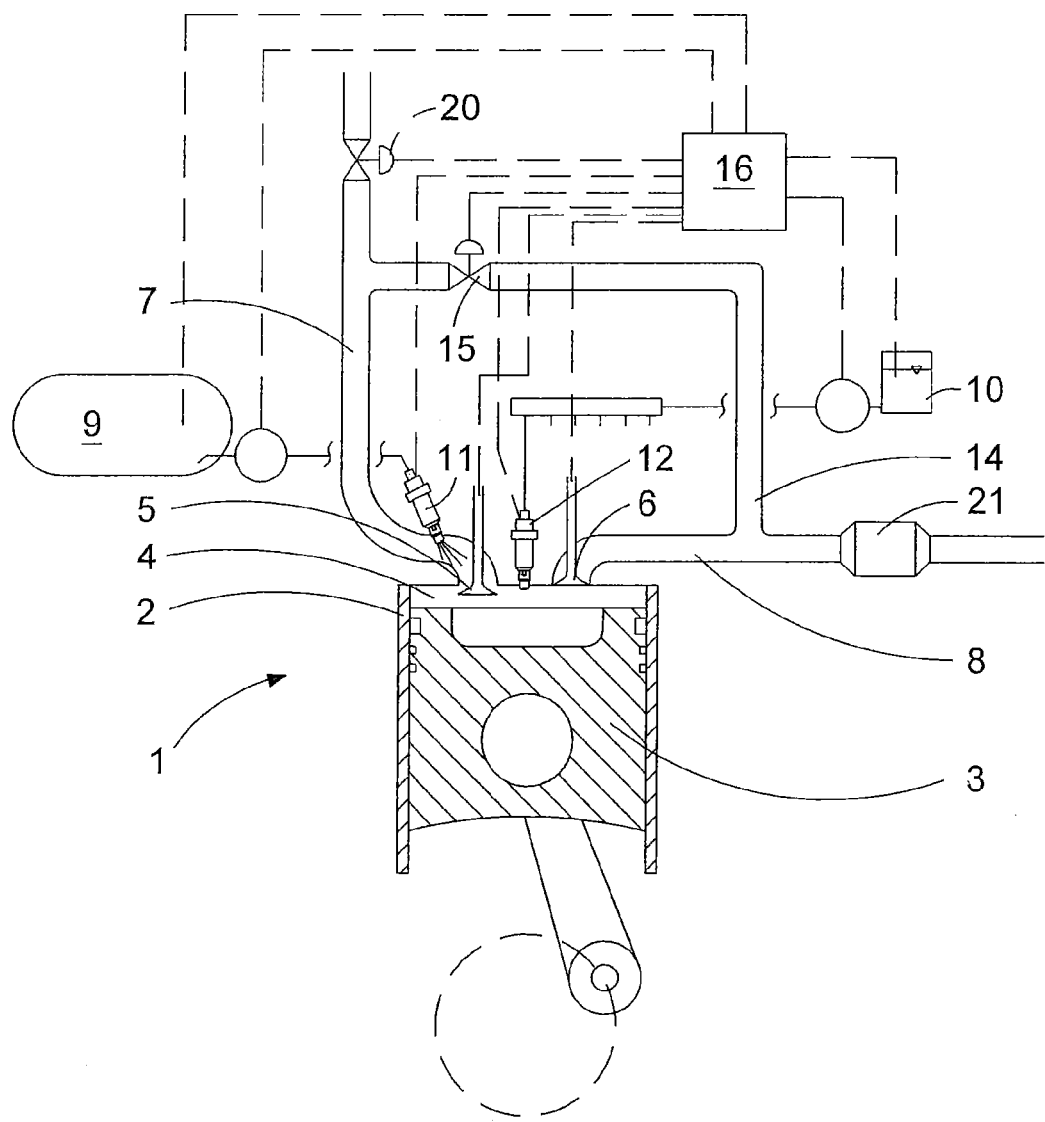
FIG. 1 is a schematic view of a throttled, stoichiometric, compression ignition, internal combustion engine equipped with a three way catalyst exhaust treatment subsystem and having an injector that injects gaseous fuel into the intake manifold.

FIG. 1 shows a schematic view of engine system 1 which comprises an example of one embodiment of a gaseous fuelled stoichiometric, compression ignition, internal combustion engine. In this example, stoichiometry can be controlled in part using throttle 20 to control the amount of intake air and in part by using EG valve 15 to control the amount of exhaust gas that is recirculated. Engine system 1 is also equipped with three way catalyst 21 for treating the engine exhaust that exits combustion chamber 4 through exhaust valve 6.

An actual engine typically comprises a plurality of cylinders and combustion chambers, but for illustrative purposes the internal combustion engine shown in FIG. 1 only comprises combustion chamber 4 defined by cylinder 2, and reciprocating piston 3. Intake valve 5 and exhaust valve 6 respectively allow for the entry of the air/fuel mixture into combustion chamber 4 and for the exit of combustion exhaust gases therefrom. Engine system 1 is also provided with intake manifold 7 and exhaust manifold 8 that are fluidly connected to intake valve 5 and exhaust valve 6 respectively.

The primary fuel used in engine system 1 is a gaseous fuel, which is supplied from primary fuel supply 9 and introduced into intake manifold 7 by primary fuel injector 11 in the vicinity of intake valve 5. The shown embodiment is sometimes described as port injection because that portion of intake manifold 7 is typically described as the intake port. Relatively low injection pressures, for example about 1-15 bar (gauge), can be used when introducing the gaseous fuel at this location. Since port injection is well known for gaseous fuel such as natural gas, primary fuel supply 9 can be an appropriate fuel supply subsystem developed for supplying port injectors with the fuel stored as either compressed or liquefied natural gas.

Compression alone is generally not a reliable approach for igniting air/gaseous fuel mixtures. As previously discussed with respect to known approaches, a strategy for assisting the ignition of an air/gaseous fuel mixture is desirable. Whereas with port injected gaseous fuels this ignition assist is normally achieved with a spark plug, the present arrangement employs an appropriate pilot fuel, such as diesel fuel, which is supplied from pilot fuel supply 10 via a small common rail and introduced directly into combustion chamber 4 by pilot fuel injector 12. Relatively high injection pressures, for instance 200-2000 bar, are used to atomize and disperse the liquid diesel fuel and to overcome the relatively higher pressures present in combustion chamber 4 as a result of the compression stroke, compared to the pressures in intake manifold 7.

Engine system 1 further comprises an exhaust gas recirculation (EGR) subsystem represented schematically here by EGR conduit 14 and controllable EGR valve 15. As shown in FIG. 1, the amount of ambient air admitted to intake manifold 7 is regulated by throttle 20. Electronic programmable engine controller 16 receives signals from sensors (not shown) that detect certain engine operating parameters such as temperature, pressure, fuel levels in the fuel storage tanks, and that individually or collectively indicate certain engine conditions and controls various engine components, some of which are shown, such as primary fuel injector 11, pilot fuel injector 12, EGR valve 15, intake valve 5, exhaust valve 6 and throttle 20. In FIG. 1 the dashed lines represent the signal wires that send sensor signals to controller 16 and the signal wires that send control signals from controller 16 to the connected engine components. It is generally recognized that engine controller 16 can be used to sense other engine operating parameters and to control components other than those depicted here.

In normal operation, engine controller 16 controls engine components in response to a variable engine load determined by an operator. Controller 16 determines a desired stoichiometric combustion mixture based on a commanded load and increases or decreases the injected amount of gaseous primary fuel accordingly. In addition, controller 16 adjusts throttle 20, intake valve 5 and EGR valve 15 to admit desired amounts of air and diluting exhaust gas respectively into intake manifold 7. Later, during the compression stage, controller 16 operates pilot fuel injector in order to obtain the desired amount, rate, and timing of injected pilot fuel.

During normal operation engine controller 16 is programmed to maintain a stoichiometric air/fuel ratio and if controller 16 detects that the air/fuel ratio has strayed from being stoichiometric, controller 16 controls the connected engine components to restore a stoichiometric oxidant/fuel ratio. As described herein, controller 16 can have a plurality of components that it can control in order to adjust the oxidant/fuel ratio and controller 16 is programmed to adjust one or more of such components depending upon the detected engine parameters and the determined engine conditions. By maintaining a stoichiometric air/fuel ratio, the engine exhaust is substantially oxygen free and thus a relatively simple and inexpensive conventional three way catalyst subsystem 21 is employed as an emissions treatment subsystem. However, without departing from the present technique, for brief periods, engine 1 can be operated in non-stoichiometric modes such as during cold start, regeneration of exhaust gas treatment devices, when operating in an exhaust gas catalyst temperature protection mode, or a diesel only mode (for example, when natural gas is not available.

Instead of or in addition to employing throttle 20, an alternative embodiment for controlling the air/fuel mixture uses different variable valve actuation strategies to control the amount of charge introduced into the combustion chamber through intake valve 5.

In the shown embodiment, the opening and closing of intake valve 5 and exhaust valve 6 is controlled by controller 16. In preferred embodiments, variable valve actuation strategies enable control of both timing and lift of the intake valve. Such variable valve actuation devices comprise electronically controlled electromagnetic valves. Variable valve actuation strategies have introduced an additional variable to engine operation that has unexpected effects. For example, from experimental results it was found that the strategies that employ just advancing or delaying the timing of the intake valve opening compared to a conventional intake valve opening timing, without controlling how long the intake valve stays open, did not have a beneficial effect. Such timing strategies either increase the pumping work required to deliver the necessary amount of air to the combustion chamber or result in a net increase in fuel consumption, as it was observed when delaying the timing of the intake valve opening, or they can interfere with the piston stroke and can introduce relatively high levels of residuals into the exhaust stream, as it was observed when advancing the timing of the intake valve opening. It was found that it is more beneficial for the overall engine efficiency to maintain the timing of the intake valve opening at around TDC (top dead center) before the piston's intake stroke and to advance or delay the timing of the intake valve closing, as further described below.

Figure 2:
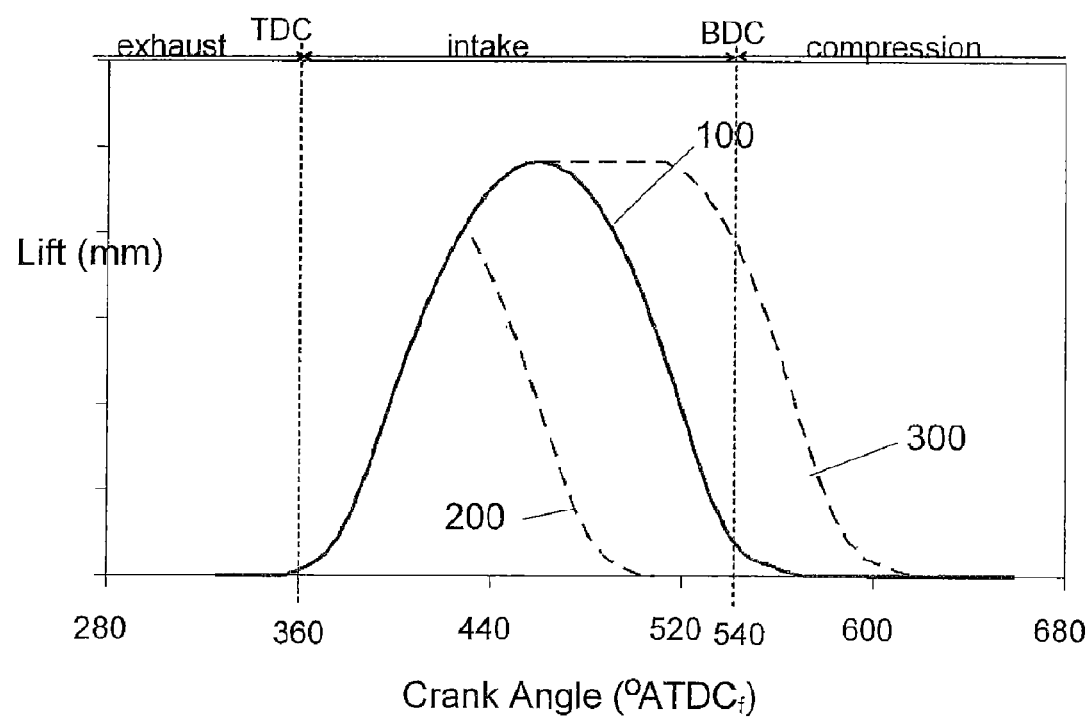
FIG. 2 shows the intake valve lift and opening duration for different valve actuation strategies that employ early or late intake valve closing.

FIG. 2 illustrates the intake valve lift and the intake valve opening duration, measured in crank angle degrees "after top dead center firing" (ATDC$_f$) for different intake valve actuation strategies. The crank angle is zero at TDC$_f$ which indicates the point at which the cylinder volume is minimized between the piston's compression and power strokes. In FIG. 2 a crank angle of 360° ATDC$_f$ indicates top dead center (TDC) which is the point of minimum cylinder volume at the beginning of the piston's intake stroke and a crank angle of 540° ATDC$_f$ indicates bottom dead center (BDC) which is the point of maximum cylinder volume at the end of the piston's intake stroke.

A conventional engine which does not have variable valve actuation typically has a valve lift profile as the one indicated by reference number 100 with the intake valve opening at TDC and closing at or near BDC. A first VVA embodiment employing a variable valve actuation strategy is indicated by the intake valve lift profile 200 and comprises opening the intake valve around the same time as with a conventional strategy, more specifically around top dead center (TDC) before the intake stroke, at a crank angle of 360° ATDC$_f$ and closing the intake valve early compared to the conventional strategy indicated by the intake valve lift profile 100 for the same engine. That is with this first embodiment the intake valve is closed during the piston's intake stroke before the piston has moved to a BDC position. This strategy preferably involves reducing the intake valve lift.

The early intake valve closing illustrated by the intake valve lift profile 200 comprises closing the intake valve at least 20 crank angle degrees before the intake stroke ends (before BDC). Preferably, the early intake valve closing illustrated by profile 200 comprises keeping the intake valve open for 20 to 180 crank angle degrees after opening it.

A second VVA embodiment indicated by the intake valve lift profile 300 comprises opening the intake valve around the same time as with a conventional strategy indicated by the intake valve lift profile 100, more specifically at around TDC before the intake stroke, at a crank angle of 360° ATDIC$_f$, and closing the intake valve later during the compression stroke, more specifically closing the intake valve after 20 crank angle degrees after the end of the intake stroke (after BDC), at a crank angle greater than 560° ATDIC$_f$. Late intake valve closing comprises closing the intake valve at around 20 to 120 crank angle degrees after the intake stroke ends (after BDC). In this second VVA embodiment, the maximum intake valve lift could be less than the maximum intake valve lift used in the conventional strategy indicated by the intake valve lift profile 100 for a portion or all of the duration of the intake valve opening.

The inventors' experimental results have shown that better fuel consumption and emission reduction at both low and high loads can be achieved by the early and late intake valve closing strategies described above.

During engine operation at high loads both early intake valve closing and late intake valve closing have the effect of reducing the effective engine compression ratio with an overall result of reducing the in-cylinder temperature at the end of compression. By closing the intake valve early or late it was observed that the danger of engine knock at high loads can be reduced without having to alter the engine's geometric compression ratio. That is, the present method allows engine operation at higher geometric compression ratios than conventional SESI engines, while operating with lower effective compression ratios which has an overall result of reducing the in-cylinder temperature at the end of compression and preventing knock. This is especially beneficial for engines fuelled with a stoichiometric fuel ratio, which are more prone to engine knock compared to engines that are fuelled with a lean fuel mixture. Because the compression process inside the combustion chamber essentially starts when the intake process ends, the effective compression ratio is defined as the ratio between the volume of the combustion chamber when the intake air flow through the intake valve stops and the volume of the combustion chamber at the end of the compression stroke. For both the early and the late intake valve closing the volume of the combustion chamber at the time when the intake air flow through the intake valve stops is smaller than the volume of the combustion chamber when the piston reaches the bottom dead center (before the compression stroke), as is the case in the conventional intake valve lift profiles, and therefore the effective compression ratios for the early and late intake valve closing are smaller than the conventional effective compression ratios. This leads to lower in-cylinder temperatures at the end of the compression stroke and in the end gases during combustion, reducing the potential for knock.

To maintain the required power for the engine's stoichiometric operation the charge mass introduced into the combustion chamber during the above described valve actuation strategies has to be maintained relatively constant to maintain a given power output. This can be achieved by controlling the boost pressure which is defined to be the pressure in the intake manifold. As the effective compression ratio is reduced, the boost pressure required to meet a given load increases.

While at high loads the above valve actuation strategies do not generally require the use of throttling, at low loads, throttling is preferably used together with varying the timing of the intake valve closing to adjust the amount of air introduced in the combustion chamber, especially during short intake valve opening durations. The intake valve response time is generally slower than the throttle response time and therefore it would be generally more difficult to control the air mass introduced into the combustion chamber just by using only the above described valve actuation techniques at low loads.

Another technique for preserving the required charge mass to be injected into the combustion chamber at low loads while reducing pumping losses is deactivating some of the engine cylinders so that the engine operates with a reduced number of cylinders. Cylinder deactivation involves increasing the charge mass that is introduced into the combustion chamber per firing cylinder; this results in a higher in-cylinder pressure during the intake stroke for the firing cylinders and therefore reduced pumping work.

Engine systems generally comprise a turbocharger, where a turbine installed in the exhaust system uses the enthalpy in the exhaust to drive a compressor in the intake system which increases the intake air pressure. For such systems, another technique for maintaining the required charge mass introduced into the combustion chamber while reducing the pumping work done by the system at low loads is to open a bypass valve (called "wastegate") such that some or all of the exhaust gas bypasses the turbocharger after exiting the engine. When bypassing the turbocharger less backpressure is created in the exhaust gas line and therefore less pumping work is required for pushing the exhaust gas out of the combustion chamber. Also, when some or all of the exhaust gas flow bypasses the turbocharger, the pressure of the air supplied to the engine remains lower and intake air can be delivered to the engine without throttling.

Figure 3:
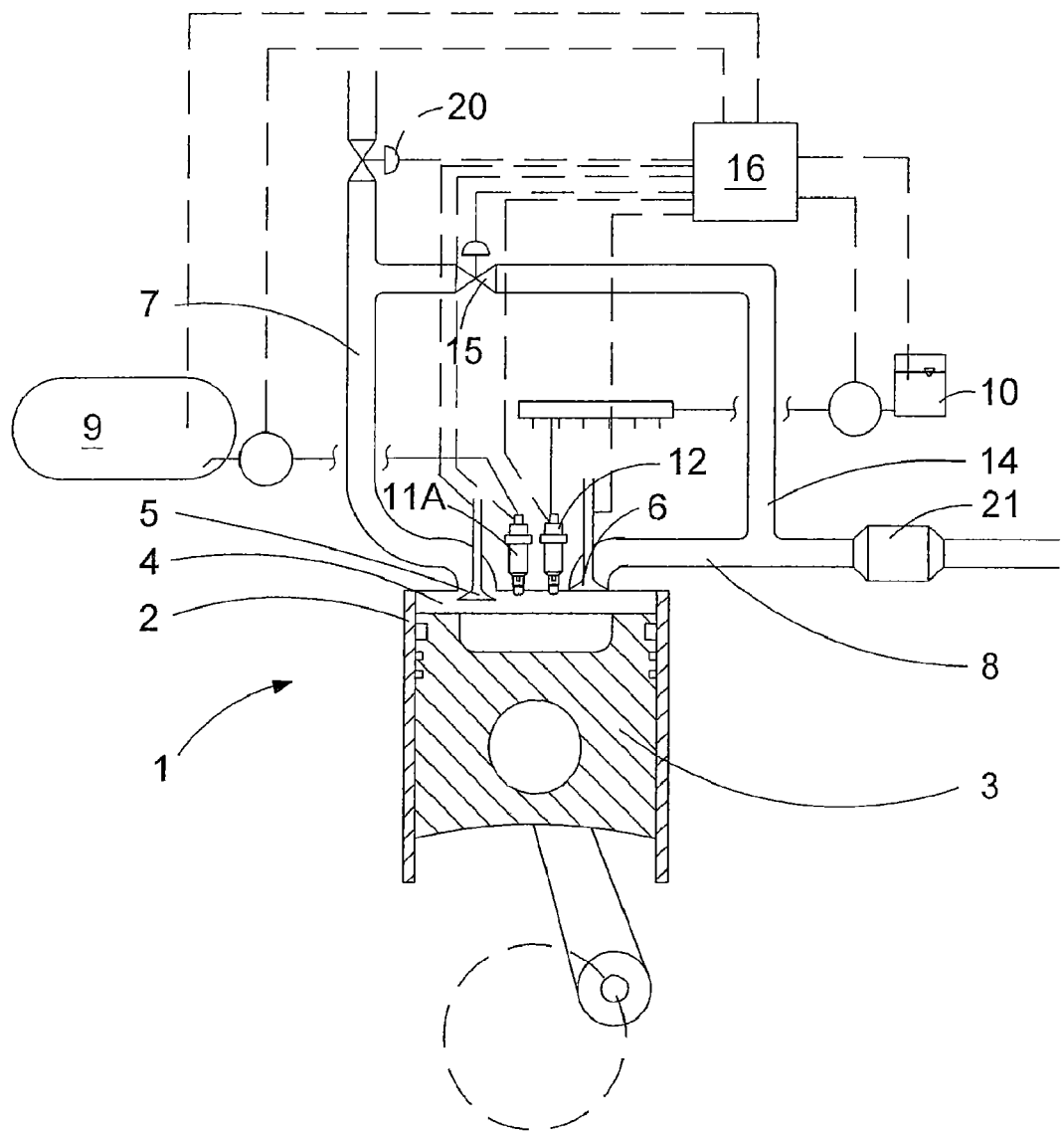
FIG. 3 is a schematic view of throttled, stoichiometric, compression ignition, internal combustion engine equipped with a three way catalyst exhaust treatment subsystem and having an injector that injects gaseous fuel directly into the combustion chamber.

In another alternative embodiment, shown in FIG. 3, the low pressure primary fuel injector 11A can be located with a nozzle located within combustion chamber 4 with the primary fuel injector valve body mounted in the cylinder or in the cylinder head for introducing the gaseous fuel directed into the combustion chamber instead of with the intake air through intake valve 5. In order to avoid the added complexity associated with raising the gaseous fuel to a higher injection pressure, according to the present method, injection of the gaseous fuel is preferably completed early during the compression stroke. This approach can be more advantageous in embodiments that employ variable valve actuation strategies and devices, because then the amount of oxidant introduced into combustion chamber 4 is controlled more independently from the amount of fuel. The embodiment illustrated in FIG. 3 has many components that are the same with the components of the embodiment presented in FIG. 1 and they have been identified with the same reference numbers. These components have been already described with respect to the embodiment illustrated in FIG. 3 and therefore their purpose and function is not repeated here.

Similar variable intake valve actuation strategies to the ones described above can be applied to the intake valves used for engines where the gaseous fuel is injected directly into the combustion chamber, and in such embodiments the closing of the intake valve is preferably timed to precede the gaseous fuel injection. That is an intake valve profile like the one indicated by reference 200 in FIG. 2 would be an example of a preferred embodiment since this would facilitate early injection of the gaseous fuel.

A still further alternative embodiment could employ pulse width modulation of the natural gas injected into the intake manifold. Pulse width modulation is a common, inexpensive and robust way to reliably deliver fuel to the intake manifold in a precise and controlled way.

The present method and apparatus offers a unique combination of elements. Whereas each individual element on its own might have expected benefits such benefits are not certain or may be limited when combined with other elements because a change in one element can affect another element. The present method and apparatus has been found to produce performance characteristics different from known gaseous-fuelled engines. For example, compared with SESI gaseous-fuelled engines, compression ignition of diesel pilot fuel enables operation at higher compression ratios and increased level of EGR. In turn, this leads to reduced fuel consumption (up to ~5%), higher BMEP ratings, and higher efficiency than is currently possible in SESI engines (mainly due to combustion knock limitations). Also, relative to SESI engines, an improved robustness to variations in natural gas quality is expected (since the ignition energy from combustion of the pilot fuel is several orders of magnitude higher than that of a spark and there are multiple sites for ignition thereby promoting faster and more uniform burning, which in turn is believed to lead to increased EGR tolerance and reduced knock tendency). It is believed that compared to SESI engines, the durability of the pilot ignition components should be increased because the lifetime of injectors is typically several times that of spark plugs. With regard to emissions, properties can be similar to SESI engines because of the stoichiometric air/fuel ratio maintained during normal operation by the present method and apparatus allowing the use of a conventional 3 way catalyst emissions treatment subsystem, with the possible exception of particulate emissions due to the use of small amounts of pilot fuel.

Unlike dual fuel natural gas engines that operate in lean mode (that is, with a significant excess of oxygen in the fuel mixture), the present method and apparatus does not require a more complicated and expensive emissions treatment subsystem to meet current emissions standards. A typical dual fuel emissions treatment subsystem employs an oxidation with a stratified combustion process, so HPDI gaseous-fuelled engines typically require a more complicated and expensive emissions treatment subsystem, which typically includes an oxi-catalyst, combined with SCR and a DPF. Here again, the different combination of elements taught by the present method and apparatus produces a different result that provides a simpler and potentially less expensive alternative that could be easier to implement in smaller engines, while still offering competitive performance.

Further to what has already been described, Table 1 illustrates some of the key differences between the presently present method and apparatus compared to the above-described known engines and methods of operating them, by comparing some of their attributes and/or characteristics.

TABLE 1

| Attribute/characteristic | SESI | Dual fuel | HPDI | Present Method and Apparatus |
| --- | --- | --- | --- | --- |
| Ignition method | Spark ignition of gaseous fuel (no pilot) | Compression ignition of pilot triggers ignition of gaseous fuel | Compression ignition of pilot triggers ignition of gaseous fuel | Compression ignition of pilot triggers ignition of gaseous fuel |
| Ignition hardware | Spark plug | Pilot fuel injector for injecting pilot fuel directly into the combustion chamber | Pilot fuel injector for injecting pilot fuel directly into the combustion chamber | Pilot fuel injector for injecting pilot fuel directly into the combustion chamber |
| Gaseous fuel injection method | Low pressure, single or multi point in intake manifold or ports | Low pressure, single or multi point in intake manifold or ports | High pressure, direct in cylinder | Low pressure, single or multi point in intake manifold or ports, or directly into cylinder |
| Expected % gaseous fuel of total fuel | 100% | Up to ~60% | Up to ~90% | Up to ~90% |
| Throttle or other air/fuel ratio control means | Yes | No | No | Yes |
| Main combustion | Stoichiometric homogeneous | Lean homogenous | Stratified | Stoichiometric homogeneous |
| Possible compression ratio | ≤12:1 | ≤17:1 | ≤20:1 | ≤14:1 |
| Relative potential efficiency | Moderate | Moderate | High | Moderate to high |
| Potential BMEP | 20 bar | 16 bar (if <10% of energy comes from pilot fuel) | 30 bar | 23 bar |
| Potential for Engine Knock | Yes | Yes | No | Yes |
| Emission treatment | 3 way catalyst | Oxi-catalyst, DPF, & SCR | Oxi-catalyst, DPF, & SCR | 3 way catalyst & DPF |
| Relative Cost | Lowest | Moderate | High | Low | catalyst (oxi-catalyst), selective catalytic reduction (SCR), and a diesel particulate filter (DPF). Thus, the unique combination of elements taught by the present method and apparatus offers benefits over dual fuel engines in this regard.

Of prior art engine options, HPDI gaseous-fuelled engines offer superior performance, for example, as measured by efficiency and BMEP. However, these engines require a high pressure gaseous fuel delivery subsystem to enable injection of the gaseous fuel directly into the combustion chamber late in the compression stroke, and this generally requires a pressure boosting pump and gaseous fuel injectors with nozzles that are located inside the combustion chamber. Finding room within the combustion chamber to locate nozzles for a gaseous fuel injector and a pilot fuel injector can be a challenge in small engines, especially modern engines with much of the space in the cylinder head already occupied by two intake valves and two exhaust valves. Furthermore, like conventional diesel engines, HPDI gaseous-fuelled engines operate While the unique approach of the present engine arrangement offers simplifications and/or other advantages over known gaseous-fuelled engines, there are also some aspects that present different challenges. For example, in an HPDI engine, combustion knock is not a problem because the fuel is generally injected directly into the combustion chamber at a timing that is near top dead center so that there is substantially no possibility of combustion knock. With the present engine arrangement, the primary gaseous fuel is introduced into the combustion chamber with the intake air or earlier in the engine cycle so that premature detonation, which is what is known as combustion knock is a possibility that needs to be guarded against, especially when it is desirable to retain a relatively high compression ratio to maintain robust ignition under all relevant operating conditions.

Reducing the engine's compression ratio, compared to diesel engines, is one approach to reducing the likelihood of combustion knock that is typically used by SESI engines and to a lesser degree by Dual Fuel engines. However, reducing the compression ratio makes it more challenging to promote strong and reliable ignition under all relevant operating conditions.

It is estimated that the energy from the ignition of a small amount of pilot diesel fuel can be three to four orders of magnitude greater than that of a spark plug in a SESI engine, and by using a plurality of pilot fuel injection sprays, a much larger ignition zone is provided by the pilot fuel. This results in improved ability to burn a charge that is diluted with higher levels of EGR, so that unlike SESI engines, which are limited by the ignition energy of the spark plugs, with the present method and apparatus more EGR can be used to suppress engine knock. At the same time, higher levels of EGR also affect the air/fuel ratio because there is substantially no oxygen in the recirculated exhaust gas which displaces some of the fresh air, so the amount of EGR commanded needs to be coordinated with the control of throttle 20.

In the examples presented below, combustion computational fluid dynamics modeling was carried out to investigate knock tendency, efficiency and emissions of the present method and apparatus. These simulations show that the present method and apparatus can achieve a remarkably high BMEP (≥23 bar) and can moderately improve thermal efficiency compared to conventional SESI engines, while still acceptably controlling combustion knock. Combustion in the present engine yields a higher rate of heat release than a conventional SESI engine so that the optimal ignition timing for best thermal efficiency is retarded compared to a SESI engine. This retarded start of ignition timing allows the present engines to operate at higher brake mean effective pressure (BMEP) with significantly lower combustion knock indices than otherwise identical SESI engines. This advantage is more pronounced at higher compression ratios.

To further reduce the tendency for combustion knock, the present method and apparatus also allows the use of several additional strategies. Because combustion knock is most sensitive to the in-cylinder temperature in the engine, a strategy that can reduce the end gas temperature can be beneficial. These strategies include increasing the amount of cooled EG to increase charge dilution, sizing the EGR cooler to provide increased cooling to the EGR gases, increasing intake charge air cooling such that intake charge temperature on entering the cylinder under all relevant operating conditions is below 60° C., lowering the engine effective compression ratio by varying valve actuation as described earlier. A further strategy includes reducing ring blow-by to be less than about 2% relative to the airflow on a volumetric basis. (This is because oil in the blow-by contributes to combustion knock reactions.)

In order to suppress combustion knock with the present method and apparatus, computational and experimental results suggest that it is best to keep the compression ratio lower than that of a conventional diesel or HPDI engine. As a result, it is more difficult to ensure that the injected pilot diesel fuel will auto-ignite under all relevant operating conditions. Calculations show that the present engine arrangement can theoretically ignite diesel at compression ratios between 12:1 and 13:1 for engine operating conditions above 0° C. These calculations involved determining the effect of compression ratio on end of compression temperature in the engine cylinder for various intake charge temperatures. Below 0° C., a cold starting device such as a block heater or an air heater may be needed; using a glow plug is not recommended in this case as it has the potential to induce the charge to ignite during the intake event, leading to uncontrolled combustion in the intake manifold ("backfire"). Methods of controlling the actuation of the intake or exhaust valve could also be used to increase the in-cylinder temperature and thereby enhance auto-ignition of the diesel pilot, by retaining more hot exhaust gases in the cylinder.

Other technical issues may require special consideration when using embodiments of the present engine. For example, as previously discussed, while the present engines can be more tolerant to variations in natural gas composition compared to SESI engines, the present engines can be less tolerant in this respect compared to HPDI gaseous-fuelled engines. Accordingly, in some embodiments combustion sensing and a control strategy for making adjustments to engine operation responsive to measured combustion behavior can be helpful in combination with the present engine arrangement. For example, co-owned U.S. Pat. Nos. 7,133,761, 7,200,487 and 7,444,231 disclose examples of methods and apparatuses that could be used for this purpose. Also, if micro-pilot fuel operation is employed, attention will be required in order to control the pilot fuel quantity to sufficiently small levels while retaining adequate pulse width and sufficiently high injection pressure, for example, to aid atomization. Furthermore, due to the considerably reduced flow of pilot fuel in some circumstances, the pilot fuel injector is preferably designed to operate satisfactorily at higher temperatures than conventional diesel injectors and/or be designed with features for cooling the injector tip or other features for preventing overheating and/or the accumulation of carbon deposits, also known as "tip carboning".

Another technical challenge relates to accurate control of the engine system, which is expected to be more complicated than that for a SESI engine due to the presence of pilot diesel. Nevertheless, while unique control strategies are needed for the present method and apparatus, technology already exists for managing two different fuels, such as the technology developed for HPDI gaseous fuelled engines that use a primary gaseous fuel and a pilot fuel for ignition. And likewise, while embodiments of the present method and apparatus can incorporate similar steps and components as those for prior art engines, to reflect the uniqueness of the present combination of elements the combination of steps and the manner of controlling the different elements are different. For example standard methods can be used in such things as the determination of the optimal compression ratio (to achieve pilot ignition under typical operating conditions while suppressing combustion knock and achieving highest possible BMEP and lowest possible methane number operation), preferred injector design (for instance number, shape and configuration of jet holes), and piston bowl shape and swirl ratio (note that the reverse nebula piston shape used in some SESI engines will most likely not be suitable for the present engine configuration due to interference of pilot fuel spray by the piston shape).

The following examples are provided to illustrate certain aspects of the present method and apparatus, but should not be construed as limiting in any way.

Calculated Engine Examples:

A numerical study was carried out to investigate combustion knock tendency and efficiency of engines of the present technique and of SESI engines operating under comparable conditions. The study involved use of a two-zone premixed combustion model and was focused at a high BMEP range (20-30 bar). The two-zone combustion model is described in Catania, A. E., Misul, D., Mittica, A. and Spessa, E., "A Refined Two-zone Heat Release Model for Combustion Analysis in SI Engines", JSME International Journal, Vol. 46, No. 1, 2003, and was modified to explore a wider parameter space to evaluate both the present combustion strategy and spark ignition combustion. The propagation of flame was modeled based on the laminar flame velocity calculated from local mixture temperature, pressure, and turbulence wrinkle factor determined from an empirical model. Diesel injection and combustion was modeled by accelerating the propagation of flame within the projected volume covered by the diesel spray. At given conditions, the potential knock intensity was characterized by the projected rate of pressure rise in the end gas. The knock intensity estimated in this example represents potential rate of energy release from the end gas assuming that the end gas is consumed within one characteristic time scale. The characteristic time scale is the auto-ignition delay time of the end gas.

The engine geometries, operating conditions and parameters used in this study are summarized in Table 2 below.

TABLE 2

| Engine and Operating Parameters | Two-Zone Model |
|---|---|
| Engine Displacement (L) | 9 |
| Methane Numbers | 87, 50 |
| Swirl Ratio | 1.0 |
| Pilot Quantities (as % of total fuel energy) | 2-2.5 |
| Engine Compression Ratios | 11:1, 14:1, 18:1 |
| Diesel Injection Timings (degrees CA BTDC) | 30, 22, 15, 10, 5 |
| Intake Temperatures | 320, 350 |
| EGR % | 21 |
| Engine Speed (RPM) | 1200 |
| Engine Load (IMEP, bar) | 20 |

From this detailed study, the following exemplary results were obtained. Table 3 below shows a comparison of indicated mean effective pressure (IMEP) in bar for both engine types fuelled with natural gas fuel having a methane number of 87, at about peak thermal efficiency (that is, $T_{intake}$=350° K) with the piston design used in the Cummins Westport ISL-G commercial engine and ignition timings of 22° and 5° crank angle before top dead center (CA BTDC) for the SESI and the present engines respectively.

TABLE 3

| Compression ratio | SESI IMEP (bar) | IMEP (bar) of present technique |
|---|---|---|
| 11 | 19.4 | 19.5 |
| 14 | 19.9 | 21.1 |
| 18 | 20.0 | 20.6 |

Figure 4A:
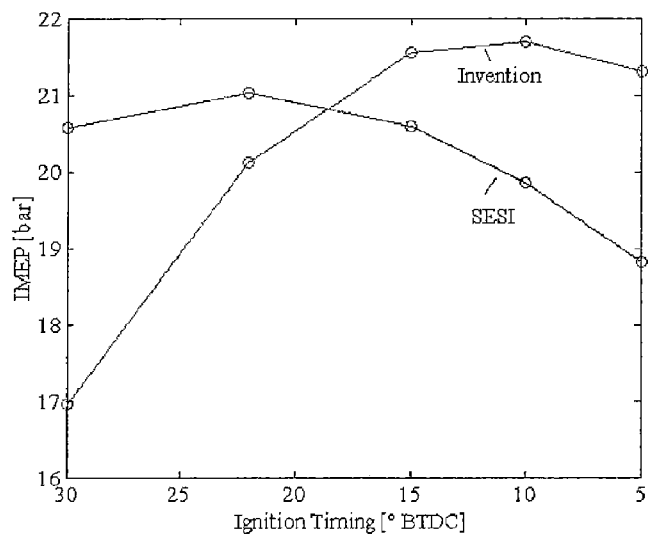
FIGS. 4a, b, and c show indicated mean effective pressure (IMEP), knock index, and thermal efficiency versus start of combustion timing results respectively for exemplary SESI and the present engines in the calculated engine examples.

In addition, FIGS. 4a, b, and c show IMEP, knock index, and thermal efficiency versus start of combustion timing results respectively for both a SESI and an embodiment of the present engine operating under similar conditions, namely an intake temperature of 320° K, compression ratio of 14:1 and methane number of 87.

Figure 4B:
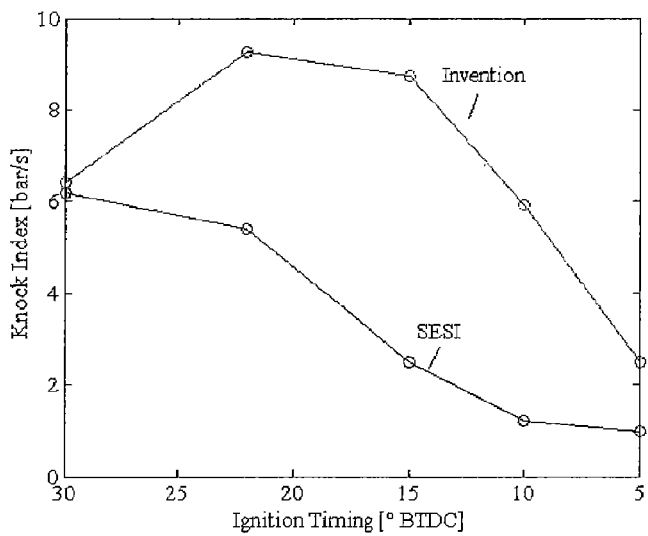
Figure 4C:
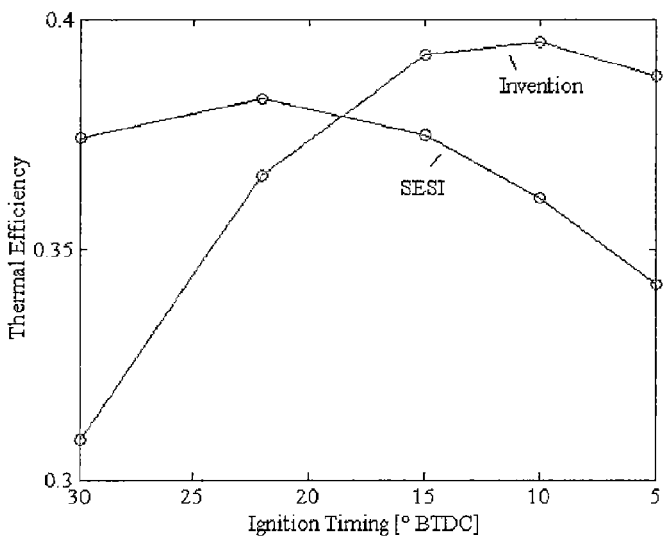

As is apparent from FIGS. 4a, 4b and 4c, the present engine exhibits an improved IEP and thermal efficiency over a wide range of ignition timings. Peak efficiencies for the present engine and a SESI engine in this example occur at start of combustion timings of 10° and 22° CABTDC, respectively. At these timings the knock index of the SESI engine is better than that of the present engine. However, at 5° CA BTDC, the IMEP and thermal efficiency of the present engine are still close to its peak values and still better than the peak SESI engine values and the knock index for the present engine is markedly lower than that of the SESI engine at its peak. Furthermore, while more conditions were studied than those shown in FIGS. 4a through 4c, in the studied conditions, the results obtained were qualitatively the same. That is, the present engine showed peak IMEPs at 10° CA BTDC but had worse knock index than the SESI engine at its peak IMEPs. However at 5° CA BTDC, in every case, the present engines had an FMEP that was close to its peak value, and still better than the comparable SESI engine peak, while the knock index was substantially better than the SESI engine at its peak.

These experimental results show that the present engine and method can unexpectedly provide better IMEP and thermal efficiency in combination with reduced knock tendency under the studied operating conditions.

From the studied conditions, it is believed that the present engine is generally able to achieve high IMEP and moderately improve on thermal efficiency compared to comparable SESI engines. Combustion in the present engine yields a higher rate of heat release than in a SESI engine so the optimal ignition timing for best thermal efficiency is retarded for the former than for the latter. This retarded start of ignition timing allows the present engine to operate at higher IMEP and efficiency with significantly lower knock indices than otherwise similar SESI engines. This advantage is more pronounced at higher compression ratios. With regards to emissions, the study shows that the present engines potentially have higher levels of NOx, carbon monoxide (CO), and particulate matter (PM) exiting the combustion chamber compared to conventional SESI engines operating under similar conditions. But after conventional 3 way catalyst emissions treatment, based on the known performance characteristics of such treatment subsystems, compared to a SESI engine it is believed that the tailpipe emissions levels from the present engine system will be substantially the same or lower. In addition, with respect to emissions of unburned hydrocarbons, the results from the computational models show that the difference between the present engine and a SESI engine are insignificant.

Modeling Results

Figure 5:
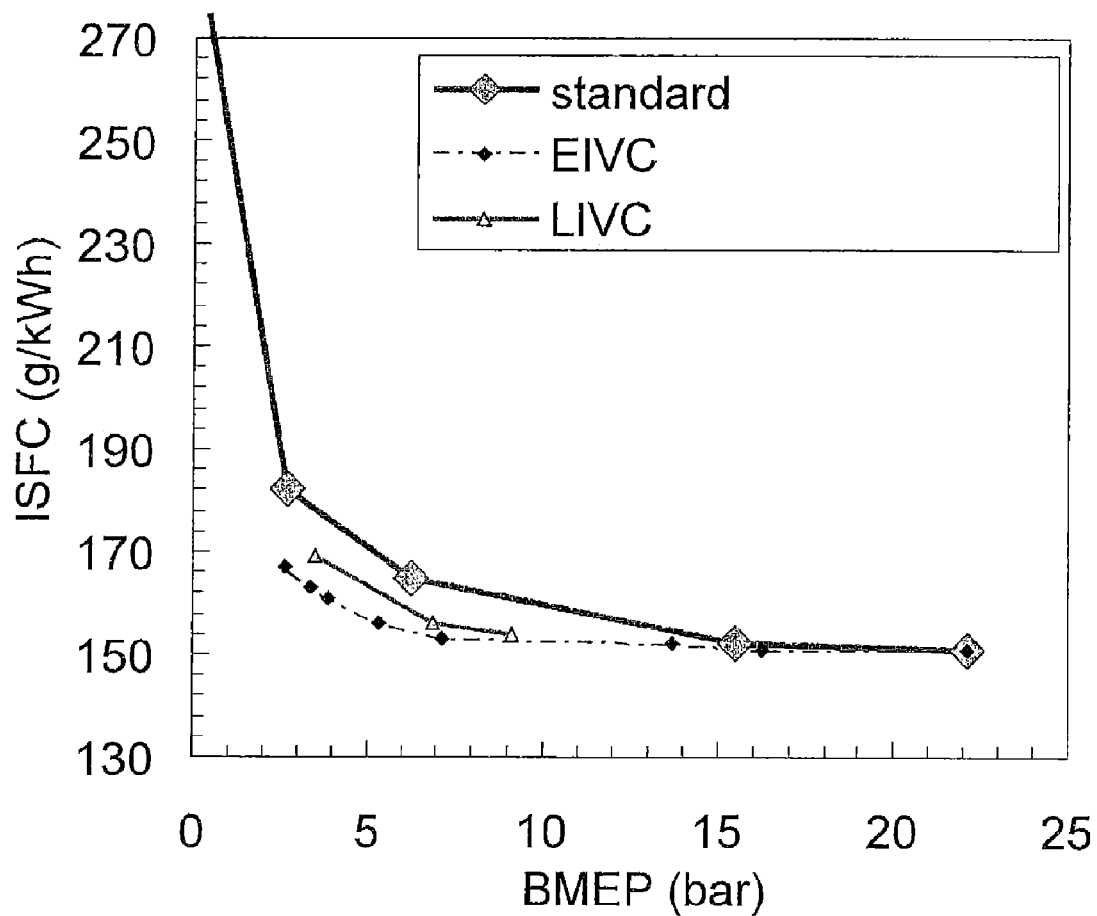
FIG. 5 shows the modeled specific fuel consumption (ISFC) versus the brake mean specific pressure (BMEP) for different intake valve closing timings applied to a medium duty gaseous fuelled internal combustion engine.

Modeling work done on a 6 cylinder medium duty engine, equipped with a variable geometry turbocharger, an exhaust gas recirculation loop, and provided with a single injector in the manifold (single point injection) has demonstrated that both early and late intake valve closing bring improvements to the overall engine efficiency and fuel consumption as compared to an engine operated with a conventional intake valve lift profile, such as the one indicated by reference number 100 in FIG. 2. Modeling results illustrated in FIG. 5 demonstrate savings in fuel consumption over a broad range of BMEP values for both the early intake valve closing (EIVC) and late intake valve closing (LIVC) compared to a more conventional valve operation with the same engine.

Figure 6:
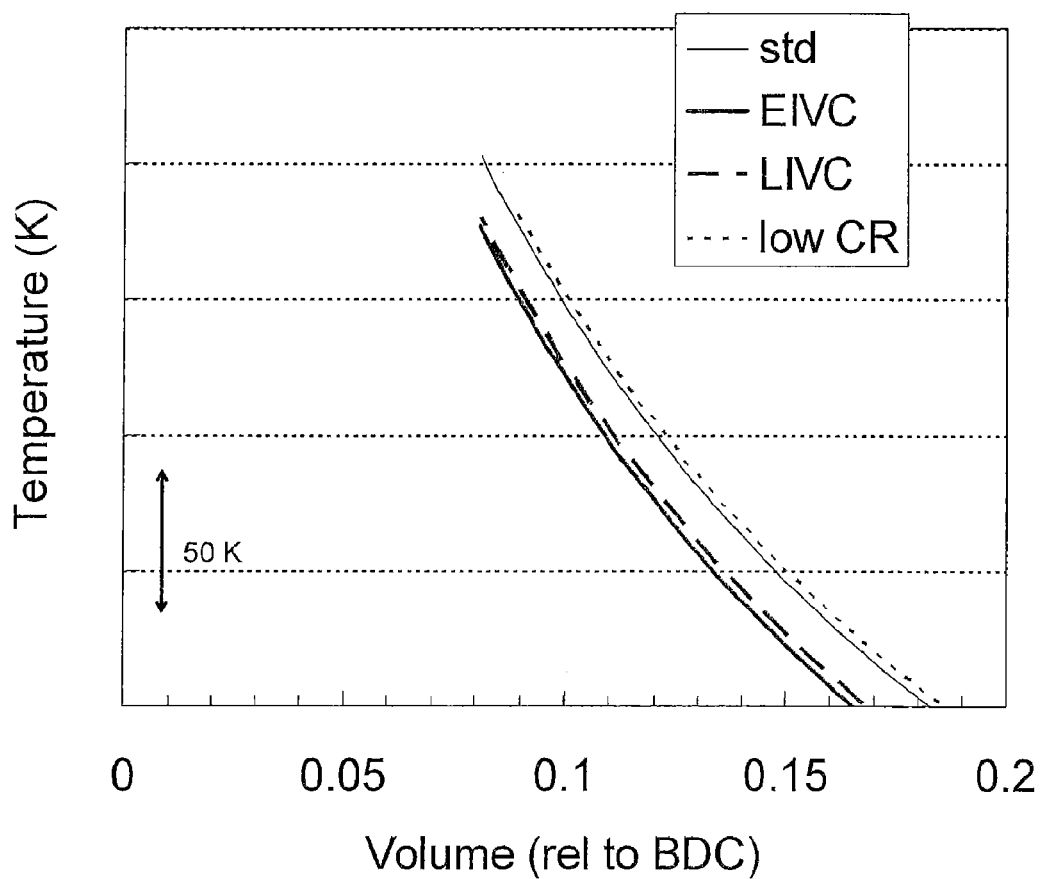
FIG. 6 shows the modeled in-cylinder temperature during the compression stroke when employing different intake valve closing timings for a medium duty gaseous fuelled internal combustion engine.

FIG. 6 further illustrates the in-cylinder temperature increase during the compression stroke for different intake valve actuation techniques. During the compression stroke, when the volume of the combustion chamber is reduced as the piston moves away from the bottom dead center (BDC), the in-cylinder temperatures for both EIVC and LIVC are lower at the end of the compression stroke than the in-cylinder temperatures at the end of the compression stroke for the standard engine operation. The in-cylinder temperature for both EIVC and LIVC at the end of the compression stroke are equivalent to the in-cylinder temperature at the end of the compression stroke recorded when the engine operates at a low compression ratio (for example, 12.7:1 compared to 14:1 which was the compression ratio used for the standard, EIVC and LIVC operation). In this simulation, the EIVC model involved closing the intake valve at around 500° ATDC$_f$ and the LIVC model involved closing the intake valve at around 630° ATDC$_f$.

Figure 7:
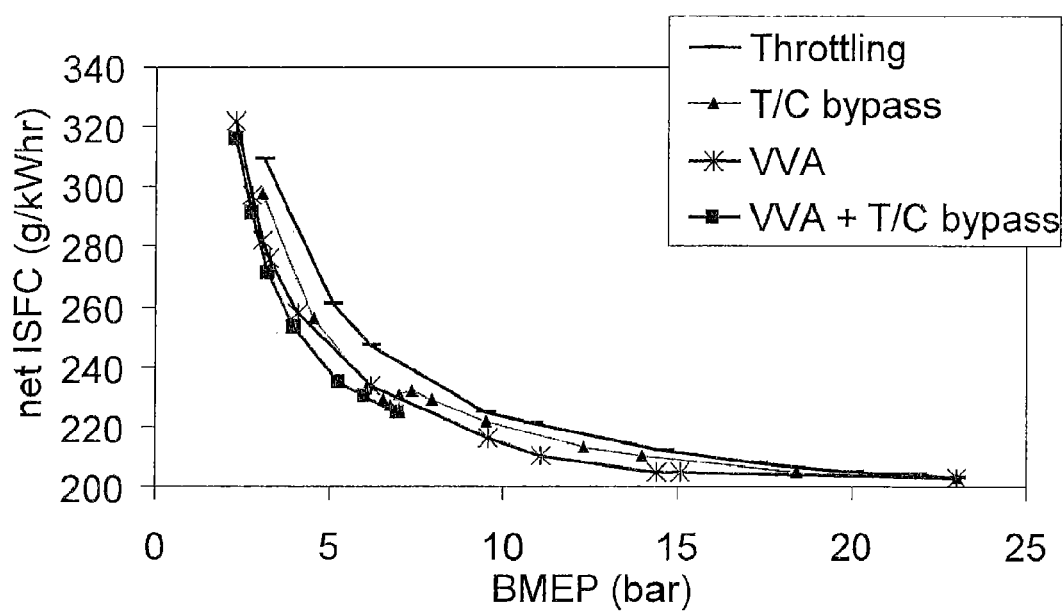
FIG. 7 shows the modeled net specific fuel consumption for different engine operation modes employing throttling, turbocharger bypass and/or variable valve actuation strategies.

The modeling results illustrated in FIG. 7 show that operating the engine with variable valve actuation (VVA) in combination with bypassing the turbocharger achieves the best fuel consumption results, especially for lower BMEPs. Using the turbocharger bypassing or the variable valve actuation techniques separately also achieve an improvement in fuel consumption over a broad range of BMEP values.

Actual Engine Examples:

A research engine was converted from a 6 cylinder, 15 L engine to operate on a single cylinder (thus 2.5 L in size). This engine was operated in different modes with natural gas as the primary fuel and conventional diesel fuel injected to act as the pilot. The engine was operated in stoichiometric mode under the following conditions:

TABLE 4

Speed: 1200 rpm
GIMEP (gross indicated mean effective pressure): 10.5 bar
EGR (% of the mass comprising the intake air and EGR): 30%
EQR (fuel/air equivalence ratio): 1
IMT (intake manifold temperature): 70° C.
GRP (gas rail pressure): 26 MPa
Diesel flow: 7 or 15 mg/injection (representing 5 and 10% of total energy per injection)
Pilot start of ignition (PSOI): 20°, 25° or 30° CA BTDC
Gas start of ignition (GSOI): 80°, 100°, 120°, 140°, 160°, or 180° CA BTDC The research engine was successfully operated under stoichiometric conditions at low to mid-speed and low- to mid-range load conditions without hardware changes to the engine.

This is a non-optimized research engine and did not use a natural gas port injector. Further, higher friction is encountered in this 6 cylinder engine operating on only 1 cylinder than would be expected in a production engine. Accordingly, there are difficulties in estimating results expected in a production engine. Still, this engine was able to achieve a thermal efficiency GISFC (gross indicated specific fuel consumption) between about 200 and 250 g/kW-hr over a 50% IHR (integrated heat release) range from 0 to 12 crank angle degrees after top dead center (CA ATDC). Using these values of thermal efficiency and assuming an expected 3% improvement would be obtained in a production engine, a brake efficiency for a production engine operating in such a stoichiometric mode was estimated to be 28%. Accordingly, it is believed that the experimental results show that competitive brake efficiencies can be obtained when operating in the described stoichiometric mode under practical conditions.

On the basis of data obtained, the following general observations were also made:

(a) combustion timing is mainly determined by diesel injection timing;
(b) gas injection timing mainly determines the completeness of the mixing process;
(c) increasing diesel flow rate moves combustion timing earlier;
(d) higher diesel flow rates help improve initial stage combustion stability, due to more repeatable and reliable ignition;
(e) with fixed timing for pilot start of injection (PSOI), methane emissions decrease with advancing timing for gaseous fuel start of injection (GSOI) due to more complete mixing;
(f) with fixed GSOI, methane emissions increase with retarded PSOI, due to incomplete combustion;
(g) higher diesel flow rates also help reduce methane emissions;
(h) retarded combustion timing results in lower NO$_x$ emissions, due to lower combustion temperature;
(i) PM emissions were significantly higher for tests with higher diesel flow;
(j) fuel consumption deteriorates with retarded combustion timing (that is, retarded PSOI).

Each of the aforementioned U.S. and foreign patent documents and non-patent publications referred to in this specification are hereby incorporated by reference herein in their entirety.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for operating a gaseous-fuelled stoichiometric internal combustion engine comprising:
  (a) determining by mass an amount of pilot fuel as a function of detected engine operating conditions;
  (b) determining by mass an amount of gaseous fuel to introduce into a combustion chamber as a function of detected engine load and based on a total energy desired minus energy associated with said amount of pilot fuel;
  (c) determining by mass an amount of exhaust gas recirculation from an engine exhaust system to an intake air system as a function of at least one of said engine load and/or another engine operating condition;
  (d) determining an amount of air required for stoichiometric combustion as a function of said amount of pilot fuel, said amount of gaseous fuel and said amount of exhaust gas recirculation;
  (e) controlling an exhaust gas recirculation system to direct a portion of said amount of recirculated exhaust gas through a cooler and then to said intake air system;
  (f) controlling a pilot fuel injector to inject said amount of pilot fuel directly into said combustion chamber;
  (g) controlling a gaseous fuel injector to introduce said amount of gaseous fuel into said combustion chamber where it forms a substantially homogenous mixture with said air and said recirculated exhaust gas;
  (h) controlling said intake air system to introduce said amount of air into said combustion chamber; and
  (i) igniting said pilot fuel by compressing an intake charge comprising said pilot fuel, said gaseous fuel, said intake air and said recirculated exhaust gas, whereby the combustion of said pilot fuel triggers the ignition and stoichiometric combustion of said gaseous fuel.

2. The method of claim 1 wherein said amount of gaseous fuel is injected through said gaseous fuel injector into an intake manifold of said engine.

3. The method of claim 1 wherein said amount of gaseous fuel is injected through said gaseous fuel injector into an intake port associated with said combustion chamber.

4. The method of claim 1 wherein said amount of gaseous fuel is injected from said gaseous fuel injector directly into said combustion chamber.

5. The method of claim 4 wherein the injection pressure of said gaseous fuel is below 50 bar.

6. The method of claim 4 wherein timing for gaseous fuel start of injection is between 80 and 180 crank angle degrees before top dead center.

7. The method of claim 4 wherein timing for gaseous fuel start of injection is during an intake stroke.

8. The method of claim 1 wherein controlling said intake air system comprises operating a throttle to increase or decrease said amount of air introduced into said combustion chamber as determined to be needed for said stoichiometric combustion.

9. The method of claim 1 wherein controlling said exhaust gas recirculation system comprises operating an EGR valve, which is part of said exhaust gas recirculation system, to increase or decrease said amount of exhaust gas recirculation as determined, as a function of at least one of said engine load and/or another engine operation condition.

10. The method of claim 1 wherein controlling said gaseous fuel injector further comprising pulse width modulating of gaseous fuel injections into said combustion chamber.

11. The method of claim 1 wherein controlling said air intake system comprises changing the timing for opening and/or closing an intake valve to increase or decrease said amount of air as determined to be needed for stoichiometric combustion, and/or to change an effective compression ratio within said combustion chamber to a compression ratio that is predetermined as a function of engine operating conditions.

12. The method of claim 1 further comprising changing an intake valve lift to increase or decrease said amount of air as determined to be needed for stoichiometric combustion, and/or to change an effective compression ratio within said combustion chamber to a compression ratio that is predetermined as a function of engine operating conditions.

13. The method of claim 1 further comprising reducing the occurrence of engine knock by using one of the following:
(j) lowering effective compression ratio within said combustion chamber by controlling timing for intake valve opening and closing and/or intake valve lift,
(k) lowering intake air temperature,
(l) increasing said amount exhaust gas recirculation, or
(m) further reducing the temperature of said portion of exhaust gas that is recirculated.

14. The method of claim 1 further comprising reducing the pumping losses when operating said engine below a predetermined low load by using one of the following:
(j) changing the timing of an intake valve opening and closing and/or an intake valve lift;
(k) in engines with a plurality of combustion chambers, deactivating at least one of said plurality of combustion chambers; and
(l) opening a bypass valve in said engine's exhaust gas system;
whereby at least some exhaust gas flowing through an exhaust l line from said combustion chamber bypasses a turbocharger installed on said exhaust line.

15. The method of claim 1 further comprising opening an intake valve when a piston associated with said combustion chamber is at or near top dead center of an intake stroke and closing said intake valve before said piston reaches bottom dead center.

16. The method of claim 15 further comprising closing said intake valve before said piston reaches 20 crank angle degrees before bottom dead center.

17. The method of claim 1 further comprising opening an intake valve when a piston associated with said combustion chamber is at or near top dead center of an intake stroke and closing said intake valve when said piston is at a crank angle greater than 20 degrees after bottom dead center.

18. The method of claim 17 further comprising closing said intake valve before said piston reaches 120 crank angle degrees after bottom dead center.

19. The method of claim 1 wherein said engine operates with a compression ratio up to 14:1.

20. The engine of claim 1 wherein said gaseous fuel is one of natural gas, biogas, biomethane, and mixtures thereof.

21. The engine of claim 1 wherein said pilot fuel is diesel.

22. A gaseous-fuelled stoichiometric internal combustion engine comprising:
(a) a combustion chamber;
(b) a gaseous fuel injector for introducing an amount of gaseous fuel into said combustion chamber;
(c) a pilot fuel injector for introducing an amount of pilot fuel directly into said combustion chamber;
(d) an intake air system comprising an intake manifold for introducing an amount of air into said combustion chamber;
(e) an exhaust gas system comprising an exhaust gas line in communication with said combustion chamber;
(f) an exhaust gas recirculation system for recirculating an amount of exhaust gas from said exhaust gas system to said intake air system, said exhaust gas recirculation system comprising a cooler for cooling recirculated exhaust gas before delivering it to said air intake system; and
(g) an engine controller programmed to control said gaseous fuel injector, said pilot fuel injector, said intake air system and said exhaust gas recirculation system to provide a stoichiometric oxygen/fuel ratio during normal operation of said engine, whereby said pilot fuel is ignited by compressing an intake charge comprising said pilot fuel, said gaseous fuel, said intake air and said recirculated exhaust gas, and combustion of said pilot fuel triggers ignition and stoichiometric combustion of said gaseous fuel.

23. The engine of claim 22 wherein said gaseous fuel injector has a nozzle that is located to inject said gaseous fuel into said intake manifold.

24. The engine of claim 22 wherein said combustion chamber has an intake port, and said gaseous fuel injector has a nozzle that is located to inject said gaseous fuel into said intake port.

25. The engine of claim 22 wherein said gaseous fuel injector has a nozzle that is located inside said combustion chamber whereby said gaseous fuel can be injected directly into said combustion chamber.

26. The engine of claim 22 wherein said intake air system further comprises a throttle.

27. The engine of claim 22 wherein said controller is programmed to control an intake valve by changing timing for its opening and closing and/or intake valve lift to affect said amount of air introduced into said combustion chamber to provide said stoichiometric combustion.

28. The engine of claim 27 wherein said controller is programmed to control said intake valve such that said intake valve opens when a piston associated with said combustion chamber is at or near top dead center of an intake stroke and said intake valve closes before said piston reaches bottom dead center.

29. The engine of claim 28 wherein said controller is programmed to control said intake valve such that said intake valve closes before said piston reaches 20 crank angle degrees before bottom dead center.

30. The engine of claim 27 wherein said controller is programmed to control said intake valve such that said intake valve opens when a piston associated with said combustion chamber is at or near top dead center of an intake stroke and said intake valve closes when said piston has reached a crank angle greater than 20 degrees after bottom dead center.

31. The engine of claim 30 wherein said controller is programmed to control said intake valve such that said intake valve closes before 120 crank angle degrees after bottom dead center.

32. The engine of claim 22 wherein said exhaust gas recirculation system comprises an EGR valve and wherein said controller is programmable to control said EGR valve to increase said amount of recirculated exhaust gas compared to an amount of exhaust recirculated in a conventional engine using spark plug ignition.

33. The engine of claim 22 wherein said exhaust gas line connected to said combustion chamber comprises a turbocharger and a bypass valve for bypassing said turbocharger, wherein said controller controls said bypass valve such that exhaust gas completely or partially bypasses said turbocharger when the engine operates below a predetermined low load.

34. The engine of claim 22 wherein said engine comprises a plurality of combustion chambers and said controller is programmed to deactivate at least one of said plurality of combustion chambers when said engine operates below a predetermined low load.

35. The engine of claim 22 further comprising a three way catalyst exhaust treatment system.

* * * * *